United States Patent
Yamashita

(10) Patent No.: US 7,200,291 B2
(45) Date of Patent: Apr. 3, 2007

(54) VARIABLE LIGHTWAVE FUNCTIONAL CIRCUIT AND VARIABLE LIGHTWAVE FUNCTIONAL APPARATUS

(75) Inventor: Shinji Yamashita, Minami-machi (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 11/439,148

(22) Filed: May 24, 2006

(65) Prior Publication Data

US 2006/0251354 A1 Nov. 9, 2006

Related U.S. Application Data

(62) Division of application No. 10/469,243, filed as application No. PCT/JP02/02031 on Mar. 5, 2002.

(30) Foreign Application Priority Data

Mar. 8, 2001 (JP) .............................. 2001-065351

(51) Int. Cl.
*G02B 6/00* (2006.01)
(52) U.S. Cl. ..................... 385/11; 385/27; 359/161; 359/341.5; 359/341.1
(58) Field of Classification Search ................... 385/11
See application file for complete search history.

(56) References Cited

U.S. PATENT DOCUMENTS 4,529,262 A  7/1985  Ashkin et al.
4,666,255 A  5/1987  Taylor et al.
6,417,948 B1*  7/2002  Chowdhury et al. .......... 385/11
2005/0213103 A1*  9/2005  Everett et al. .............. 356/479

FOREIGN PATENT DOCUMENTS

JP  63-249827  10/1988
JP  05-323396  12/1993

OTHER PUBLICATIONS

Feb. 1986, Okamoto et al., All-Panda-Fiber Multi/Demultiplexer Utilizing Polarization Beat Phenomenon in Birefringent Fibers, Electronics Leters, vol. 22, No. 4, pp. 181-182, Submitted in Parent U.S. Appl. No. 10/469,243.

(Continued)

*Primary Examiner*—Frank G. Font
*Assistant Examiner*—James P. Hughes
(74) *Attorney, Agent, or Firm*—Neifeld IP Law, PC

(57) ABSTRACT

Disclosed is a variable lightwave functional circuit comprising: an applying unit for applying lateral pressure; a polarization maintaining optical fiber having a polarization axis, for inducing a polarization mode coupling by applying the lateral pressure to a predetermined position by said applying unit; and a branching/coupling device having a first port to a fourth port, for branching laser light inputted from the first port to both said second port and said third port, and also for projecting laser light inputted from said second port to the fourth port; wherein one end of said polarization maintaining optical fiber is connected to one of said second port and said third port in such a manner that the polarization axis is inclined at a predetermined angle to an axial direction parallel to a branching plane of said branching/coupling device.

10 Claims, 10 Drawing Sheets

OTHER PUBLICATIONS

Aug. 1986, Noda et al., Polarization-maintaining Fibers and Their Application, Journal of Lightwave Techology, vol. LT-4, No. 8, pp. 1071-1089, Submitted in Parent U.S. Appl. No. 10/469,243.

Jan. 1988, Tsubokawa et al., Mode Coupling Due to External Forces Distributed Along a Polarization-Maintaining Fiber: an Evaluation, Applied Optics, vol. 27, No. 1, pp. 166-173.

Oct. 1991, Shimizu et al, Highly Practical Fiber Squeezer Polarization Controller, Journal of Lightwave Technnology, vol. 9, No. 10, pp. 1217-1224, Submitted in Parent U.S. Appl. No. 10/469,243.

Mar. 1992, Ozeki, T., Optical Equalizer, Optics Letters, vol. 17, No. 5, pp. 375-377, Submitted in Parent U.S. Appl. No. 10/469,243.

Oct. 1994, Sharma et al., Optical Circuit for Equalizing Group Delay Dispersion of Optical Fibers, Journal of Lightwave Techology, vol. 12, No. 108, pp. 1759-1765, Submitted in Parent U.S. Appl. No. 10/469,243.

Jan. 1995, Jinguji et al.,Synthesis of Coherent Two-Port Lattice-Form Optical Delay-Line Circuit; Journal of Lightwave Techology, vol. 13, No. 1, pp. 73-82, Submitted in Parent U.S. Appl. No. 10/469,243.

Oct. 1995, Fang et al., Polarization-Independent All-Fiber Wavelength-division Multiplexer Based on a Sagnac Interferometer, Optice Letters, vol. 20, No. 20, pp. 2146-2148, Submitted in Parent U.S. Appl. No. 10/469,243.

Apr. 1997, Fnag et al., A Compound High-Order Polarization_independent Birefringence Filter Using Sagnac Interferometer, IEEE Photonic Technology Letters, vol. 9, No. 4, pp. 458-460, Submitted in Parent U.S. Appl. No. 10/469,243.

Apr. 1997, Saida et al., Distributed Fiber-Optic Stress Sensor by Synthesis of the Optical Coherence Function; IEEE Photonic Technology Letters, vol. 9, No. 4, pp. 484-486, Submitted in Parent U.S. Appl. No. 10/469,243.

Jun. 1997, Tanaka et al., Fibre Optic Spectral Polarimetry for Sensing Multiple Stress-Loaded Locations Along a Length of Fibre, IEE Proc.-Optoelectron., vol. 144, No. 3, pp. 176-182, Submitted in Parent U.S. Appl. No. 10/469,243.

Sep. 2000, Yamashita et al., A Distributed Fiber Laser Stress Sensor, Technical Report of IEICE, OFT2000-45, pp. 7-12, Submitted in Parent U.S. Appl. No. 10/469,243.

Mar. 2001, Yamashita et al., Multiwavelength Fiber Lasers with Tunable Wavelength Spacing, PLANC, pp. 355-357, Submitted in Parent U.S. Appl. No. 10/469,243.

Oct. 14, 2003, IPER PCT/JP01/02031, Submitted in Parent U.S. Appl. No. 10/469,243.

Mar. 7, 2001, Teruyuki Baba "Multiwavelength Fiber Lasers with Tunable Wavelength Spacing" The Institute of Electronics, Information and Communication Engineers, Sogo Taikai Koen Ronbunshu Electronics, XP-00295586, Mar. 7, 200, P355 JAPAN, Submitted Herewith.

Oct. 15, 1995, Xiaojun Fang "Polarization-independent all fiber wavelength-division multiplexer based on a Sagnac Interferometer" Optics Letters, XP00532387, Oct. 15, 1995, 2146-2148, New York, USA, Submitted Herewith.

Feb. 7, 2006, European Patent Office Search Report for PCT/JP02/020301, Submitted Herewith.

Apr. 16, 2006, Communication Pursuant to Article 96(2) EPC, Submitted Herewith.

Oct. 23, 2005, Communication Pursuant to Article 96(2) EPC, Submitted Herewith.

Jan. 1993, Paul Humphrey "Fiber-Birefringence Tuning Technique for an Erbium-Doped Fiber Ring Laser" IEEE Photonics Technology Letters, 5 (1993) Jan. 1993, New York, USA, Submitted Herewith.

* cited by examiner (a) TIME (b) TIME

US 7,200,291 B2

VARIABLE LIGHTWAVE FUNCTIONAL CIRCUIT AND VARIABLE LIGHTWAVE FUNCTIONAL APPARATUS

CROSS REFERENCE TO RELATED APPLICATIONS

The present application is a divisional of and claims priority to U.S. patent application Ser. No. 10/469,243, filed Mar. 08, 2004, which is U.S. national stage entry of International Application No. PCT/JP02/02031, filed Mar. 5, 2002.

BACKGROUND OF THE INVENTION

The present invention is related to a variable lightwave functional circuit and a variable lightwave functional apparatus. More specifically, the present invention is directed to a variable lightwave functional circuit and a variable lightwave functional apparatus, using a mode coupling within a polarization-maintaining optical fiber.

Network technology of optical fiber communication systems has been conducted in practical fields in connection with appearances of optical fiber amplifiers in a front half decade in 1990, and is being rapidly developed. In the present stage, there are certain possibilities that ultra-long distance (e.g., up to 10,000 Km) and very high speed (e.g., up to 40 Gb/s) wavelength division multiplexed transmission systems (WDM system operable up to, e.g., 64 wavelengths) could be realized. Then, optical fiber information communication networks may be conceivable as the most important infrastructure in the beginning stage of 21 century. However, up to now, while optical fiber communication systems are mainly employed only in point-to-point correspondence trunk line systems, conventional coaxial cables and semiconductor integrated circuits/electronic devices may constitute major basic elements in network portions. Since the Internet has been currently developed in explosive manners, extensions of transfer capacities which are required for future's networks could be predicted by that the transfer capacities are extended twice per 12 months. This extension rate of the transfer capacities exceeds a so-called "Moore's law (twice per 18 months)" related to semiconductor integrated circuits. Soon or later, there is no doubt about such a fact that WDM optical networks using light are necessarily required also in these network portions. However, under the present situation, optical devices employed in such WDM optical networks have not yet been well-developed, so that very rapid development of these optical devices is necessarily needed.

SUMMARY OF THE INVENTION

That is to say, more specifically, the present invention is featured by realizing a "variable optical transversal filter using a lateral-pressure induced polarization mode of a polarization-maintaining optical fiber (PMF)". In general, a transversal filter is equipped with a repeated structure and a summation circuit, in which a delay line and a branching/weighting circuit are employed as a basic unit. Different from an electric summation circuit, since a summation circuit can be hardly realized in an optical field, a two-port-pair cascade connecting mode optical lattice type filter maybe employed [1] (note that symbol "[ ]" indicates below-mentioned reference publication number). Also, the optical lattice filter constructed of the planar lightwave circuit (PLC) with employment of the repeated Mach-Zehnder optical circuit structure has been proposed by JINGUJI et al. of NTT [2], and various sorts of the above-explained functions have be realized. Also, such a fact has been disclosed by KOSEKI of Sophia University. That is, the optical lattice filter could be manufactured even by the PMF rotational connection structure which utilizes the delays occurred between the polarization modes of the PMF as the delay, and also the rotational connection of the PMF as the branching/weighting operations [1] and [3].

However, as to these structures which have been conventionally realized, the functions and the characteristics of these structures have already been determined when the structures are manufactured, so that these functions and characteristics cannot be changed. Also, in the PMF rotational connection structures, it is practically difficult that the PMF lengths of the basic structures cannot be made coincident in higher precision.

The present invention has been made to solve the above-described difficulties, and has an object to provide both an optical fiber type variable lightwave functional circuit and a variable lightwave functional apparatus, capable of properly accepting structural changes in a WDM optical network, and furthermore, capable of having flexibilities as to various functions. As a consequence, the present invention owns such an object to provide both a variable lightwave functional circuit and a variable lightwave functional apparatus, which are capable of realizing a large number of functions, and also can be applied to optical communication apparatus such as WDM optical networks and optical transmitting/receiving devices. These various functions involve optical filtering, wavelength add/drop operation, pulse multiplexing operation, optical amplifier gain equalizing operation, optical fiber wavelength dispersion compensating operation, and the like.

Also, an object of the present invention is to provide both a variable lightwave functional circuit and a variable lightwave functional apparatus, such as an optical transversal filter whose characteristic is variable and which owns higher functions, while a lateral-pressure induced polarization mode coupling of a PMF is used instead of a PMF rotational connection, and thus, both a position and a magnitude of lateral pressure are changed.

According to a first solving means of the present invention, such a variable lightwave functional circuit is provided which is comprised of:

an applying unit for applying lateral pressure;

a polarization-maintaining optical fiber having a polarization axis, for inducing a polarization mode coupling by applying the lateral pressure to a predetermined position by the applying unit;

a first polarizer arranged at one end of the polarization-maintaining optical fiber in such a manner that a polarization axis of the first polarizer is inclined at a predetermined angle with respect to the polarization axis of the polarization-maintaining optical fiber; and a second polarizer arranged at the other end of the polarization-maintaining optical fiber in such a manner that a polarization axis of the second polarizer is made coincident with the polarization axis of the polarization-maintaining optical fiber; in which:

laser light is entered via any one of the first polarizer and the second polarizer to the polarization-maintaining optical fiber, the polarization-maintaining optical fiber changes a characteristic of the variable lightwave functional circuit by the induced polarization mode coupling in response to either a single condition of a position, a quantity, and a magnitude of lateral pressure applied by the applying unit, or plural conditions thereof; and the polarization-maintaining optical fiber projects the laser light whose characteristic has been changed through any one of the first polarizer and the second polarizer, which is not arranged on the side of laser entering port thereof.

According to a second solving means of the present invention, such a variable lightwave functional apparatus is provided which is comprised of:

an applying unit for applying lateral pressure;

a polarization-maintaining optical fiber having a polarization axis, for inducing a polarization mode coupling by applying the lateral pressure to a predetermined position by the applying unit; and a branching/coupling device having a first port to a fourth port, in which laser light entered from the first port is branched to both the second port and the third port; one end of the polarization-maintaining optical fiber is arranged between the second port and the third port in such a manner that polarization axes thereof are inclined at a predetermined angle to the branching/coupling device; the other end of the polarization-maintaining optical fiber is arranged in such a manner that polarization axes thereof are made coincident with the branching/coupling device; and laser light entered from either the first port or the second port is projected to the fourth port; in which:

laser light is entered from the third port of the branching/coupling device into the polarization-maintaining optical fiber; the polarization-maintaining optical fiber changes a characteristic of the variable lightwave functional circuit by the induced polarization mode coupling in response to either a single condition of a position, a quantity, and a magnitude of lateral pressure applied by the applying unit, or plural conditions thereof; and the polarization-maintaining optical fiber projects the laser light whose characteristic has been changed from the fourth port of the branching/coupling device.

According to a third solving means of the present invention, such a variable lightwave functional apparatus is provided which is comprised of:

an optical amplifier for outputting wavelength multiplexed light containing a plurality of pulses having a first wavelength interval;

a polarization branching/coupling device having a first port to a third port, for branching the output from the optical amplifier, which is entered from the first port into the polarization branching/coupling device, to both the second port and the third port;

a coupler arranged at the second port of the polarization branching/coupling device; and the above-described variable lightwave functional circuit arranged between the third port of the polarization branching/coupling device and the coupler; in which:

the wavelength multiplexed light containing the plural pulses having the first wavelength interval is converted into wavelength multiplexed light containing a plurality of pulses having a second wavelength interval in response to lateral pressure applied to the polarization-maintaining optical fiber, and then the converted wavelength multiplexed light is outputted from the coupler.

According to a fourth solving means of the present invention, such a variable lightwave functional apparatus is provided which is comprised of:

an acousto-optical modulator for outputting wavelength multiplexed light containing a plurality of pulses having a first wavelength interval;

a coupler arranged at an output of the acousto-optical modulator;

a polarization branching/coupling device having a first port to a third port, for branching the output form the coupler, which is entered from the first port into the polarization branching/coupling device, to both the second port and the third port;

an optical amplifier connected to the second port of the polarization branching/coupling device; and the above-described variable lightwave functional circuit arranged between the second port of the polarization branching/coupling device and the optical amplifier; in which:

multi-wavelength oscillation light is outputted from the coupler by laser light from the acousto-optical modulator.

DETAILED DESCRIPTION OF THE PREFERRED EMBODIMENTS

A. First Embodiment Mode

Figure 1:
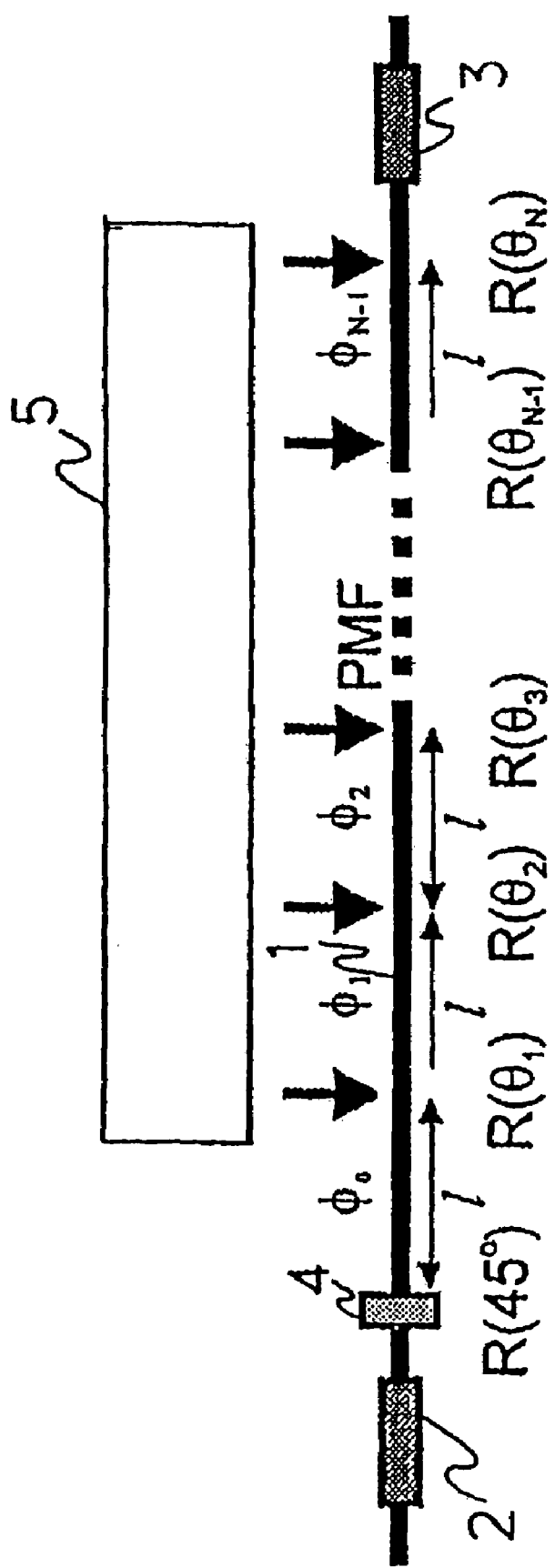
FIG. 1 is a structural diagram of an optical fiber type variable lightwave functional circuit of a first embodiment mode.

FIG. 1 shows a structural diagram for showing an optical fiber type variable lightwave functional circuit according to a first embodiment mode of the present invention. This variable lightwave functional circuit is equipped with a polarization-maintaining optical fiber (PMF) 1 having a certain length, polarizers 2 and 3, a rotator 4, and an applying unit 5 for applying lateral pressure. In this functional circuit, incident light is entered via the polarizer 2, and output light is projected via the PMF 1 and the other polarizer 3. Also, this optical fiber type variable lightwave functional circuit may be employed in such a reversible manner that incident light is entered into the polarizer 3, and output light is projected via the PFM 1 and the other polarizer 2. The input light is, for instance, signal light employed in an optical communication. Normally, this incident light corresponds to laser light emitted from a semiconductor laser is modulated by a signal. Also, while the PMF 1 owns two polarization axes perpendicular to each other, a polarization axis of the polarizer 2 is coupled in such a manner that this polarization axis is made coincident with one of the polarization axes of the PMF 1. In the PMF 1, when polarized light which is inclined at a predetermined angle with respect to the polarization axis is entered, polarization mode coupling is induced by applying lateral pressure to the PMF 1. As this predetermined angle, when an angle of, for example, 45 degrees is set, a polarization mode coupling maybe effectively induced. To this end, the rotator 4 of 45 degrees is provided on the side of one polarizer 2 in this drawing. Alternatively, instead of the rotator 4, any one of the polarizers 2 and 3 may be connected, or arranged in such a manner that this polarizer is inclined at an angle of 45 degrees with respect to the polarization axis of the PMF 1. Also, since the lateral pressure is applied to the PMF 1, the polarization axis of the polarizer 2 may be inclined by an angle of 45 degrees to be coupled to the polarization axis of the PMF 1. Furthermore, the predetermined angle is not limited to 45 degrees, but may be selected to be a proper inclination. Also, the polarization axis of the polarizer 3 may be coupled to one of the polarization axes of the PMF 1 in such a manner that this polarization axis of the polarizer 3 is made coincident with the second-mentioned polarization axis. As a means for applying the lateral pressure to the PMF 1 by the applying unit 5, for example, there is such a method that force is applied from a side surface of the PMF 1 by using a member such as a wood, plastics, and a metal. It should be noted that the PMF 1 may be nipped by way of a clip such as a binder clip. In the applying unit 5 or in the lateral pressure, a magnitude of force may be adjusted according to a clipping direction.

Next, the polarization mode coupling will now be described in detail. When lateral pressure is applied to the PMF 1 by the applying unit 5, the polarization mode coupling is induced, which is equivalent to such a fact that the PMF 1 is rotary-connected so as to induce the polarization mode coupling. As a result, a transfer matrix (Jones matrix) of a photoelectric field vector at a point to which the lateral pressure is applied may be expressed by a rotational matrix. A Jones matrix "$M_f$" of a PMF portion when the points to which lateral pressure is applied are provided in an equi-interval "1" is expressed by the following formulae:

$$M_f = S(m) \prod_{i=N-1}^{0} (R(\theta_i)C(\phi_i)S(m)) \quad (1)$$

$$S(m) = \begin{pmatrix} m & 0 \\ 0 & m^* \end{pmatrix}, C(\phi_i) = \begin{pmatrix} e^{i\phi_i} & 0 \\ 0 & e^{-i\phi_i} \end{pmatrix}, \quad (2)$$

$$R(\theta_i) = \begin{pmatrix} \cos\theta_i & -\sin\theta_i \\ \sin\theta_i & \cos\theta_i \end{pmatrix}, m = e^{i\frac{B\varpi}{2c}l}$$

In this case, symbol "$B=n_x-n_y$" indicates a modal birefringence index, symbol "$\omega$" shows an angular frequency, and symbol "c" denotes a light velocity. A rotation angle "$\theta_i$" at this time may be changed based upon the magnitude of the lateral pressure. Also, symbol "S(m)" represents a transfer matrix of a PMF having a length of "1", and symbol "m" indicates a parameter indicative of a delay between an x-polarized wave and a y-polarized wave. Symbol "$C(\phi_i)$" shows a matrix for applying a shift by a phase "$\phi$", and a phase shift may be realized by not providing the pressure-applied positions in the completely equi-interval, but by fine-adjusting the pressure-applied positions. Symbol "$R(\theta_i)$" represents a rotational matrix for rotating a polarization by an angle of "$\theta$", and a polarization rotation is induced by applying pressure.

In this case, since the Jones matrix "$M_f$" may be expressed by the following formula (3) as a unitary matrix, the below-mentioned formula (4) may be obtained as a Jones matrix "T" of the entire optical fiber type variable lightwave functional circuit:

$$M_f = \begin{pmatrix} a & -b^* \\ b & a^* \end{pmatrix}, |a|^2 + |b|^2 = 1 \quad (3)$$

$$T = \begin{pmatrix} 1 & 0 \\ 0 & 0 \end{pmatrix} M_f R(45°) \begin{pmatrix} 1 & 0 \\ 0 & 0 \end{pmatrix} = \frac{a-b^*}{\sqrt{2}} \begin{pmatrix} 1 & 0 \\ 0 & 0 \end{pmatrix} \quad (4)$$

As a consequence, in accordance with the present invention, such a function may be realized which is similar to the optical lattice circuits [1] and [3] based upon the PMF rotary connection structure which has been proposed by KOSEKI et al. of Sophia University. In other words, in both an optical fiber type variable lightwave functional circuit and a variable lightwave function (optical lattice circuit) according to the present invention, characteristics and functions thereof can be varied by changing the positions and the magnitudes of the lateral pressure, as compared with those manufactured based upon the PMF rotary connection structure, and the PMF length 1 of the basic structure can be easily coincident in higher precision.

The functions which can be realized by the optical fiber type variable lightwave functional circuit of the present invention will now be exemplified as follows:

(1) A periodic optical filter: An optical filter in which transmission wavelengths are arranged in an equi-interval period. The period may be varied and this periodic optical filter may be employed in a multi-wavelength optical source.

(2) An optical band pass filter: A so-called "Solc type optical filter." Both a central wavelength and a bandwidth of this optical bandpass filter may be varied.

(3) A wavelength add/drop circuit: A circuit for deriving either one wavelength or several wavelengths from a WDM signal. A wavelength to be derived may be varied.

(4) A pulse multiplexing circuit: A circuit for multiplying a repetition frequency of a pulse stream derived from a pulse light source. The multiplication number may be varied.

(5) An optical amplifier gain equalizing circuit: A circuit for equalizing a wavelength characteristic of a gain of an optical fiber amplifier and for flattening the equalized wavelength characteristic. The wavelength characteristic of the circuit may be varied in response to characteristics of the respective amplifiers.

(6) An optical fiber wavelength dispersion compensating circuit: The wavelength dispersion of the optical fiber can be compensated by flattening a wavelength characteristic of an amplitude of a circuit, and by setting a wavelength characteristic of a group speed to a reverse characteristic of an optical fiber. The wavelength characteristic of the group speed may be varied in response to a sort/length of an optical fiber.

It should be understood that the optical lattice circuit, the characteristic/function of which cannot be varied, has already been realized by JINGUJI et al. of NTT by employing the planar lightwave circuit (PLC) with employment of the repeated Mach-Zehnder optical circuit structure. Also, the designing method capable of realizing various functions has been proposed [1] and [2]. When a variable lightwave functional circuit of the present invention used to realize these functions is designed, for example, the designing method may be employed which have been proposed by JINGUJI et al. of NTT.

B. Second Embodiment Mode

Since the optical fiber type variable lightwave functional circuit of the first embodiment mode employs the polarizers 2 and 3, this functional circuit owns the polarization dependent characteristic. To solve this problem, such a structure of a variable lightwave functional circuit capable of realizing a polarization independent characteristic will now be explained.

Figure 2:
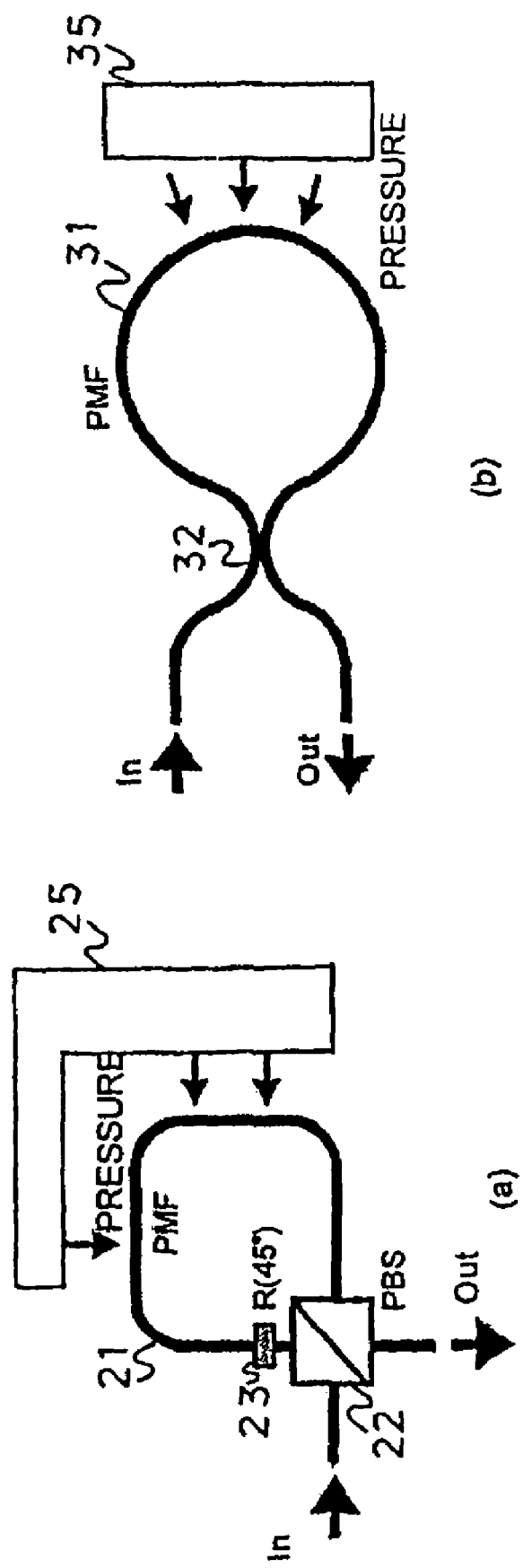
FIG. 2 is a structural diagram of a variable lightwave functional circuit of a second embodiment mode.

FIG. 2 shows a structural diagram of a variable lightwave functional circuit according to a second embodiment mode of the present invention. This second embodiment mode corresponds to a polarization independent optical fiber type variable lightwave functional circuit.

First, FIG. 2(*a*) indicates a structural diagram in which the optical fiber type variable lightwave functional circuit of FIG. 1 is rearranged so as to realize the polarization independent characteristic. This variable light wavefunctional circuit is equipped with a PMF 21, a polarization beam splitter (PBS) 22, a rotator 23, and an applying unit 25 of lateral pressure. Since the PMF 21 is jointed to each other by the applying unit 25, or is obliquely jointed to the PBS 22, a polarization axis of light derived from the PBS 22 is inclined at an angle of, for example, 45 degrees, and then is entered into one end of the PMF 21 to be outputted to the other end thereof. The light outputted from the PMF 21 is adjusted in such a manner that the polarization axis thereof is further inclined by the rotator 23 at an angle of 45 degrees, and then this light with the inclined polarization axis passes through the PBS 22. Thus, output light is outputted from the PBS 22 in this manner. It should be noted that the rotator 23 may be omitted. It is alternative case, as to the light outputted from the PMF 1, a light component along the polarization axial direction may be outputted. Furthermore, the polarization axis may be adjusted by way of the applying unit 25.

Now, a description will be made of the polarization independent characteristic. Assuming now that a right-turned Jones matrix of this PMF 21 portion is given as "$M_f$" of the above-described formula (3), a left-turned Jones matrix may be given by the following formula (5). As a result, a Jones matrix "T" of the entire variable lightwave functional circuit shown in FIG. 2(*a*) is given by the following formula (6), and thus, becomes the polarization independent characteristic:

$$M_b = \begin{pmatrix} a & -b \\ b^* & a^* \end{pmatrix} \quad (5)$$

$$T = \begin{pmatrix} 1 & 0 \\ 0 & 0 \end{pmatrix} M_f R(45°) \begin{pmatrix} 1 & 0 \\ 0 & 0 \end{pmatrix} + \begin{pmatrix} 0 & 0 \\ 0 & 1 \end{pmatrix} R(45°) M_b \begin{pmatrix} 0 & 0 \\ 0 & 1 \end{pmatrix} = \quad (6)$$

$$\frac{1}{\sqrt{2}} \begin{pmatrix} a - b^* & 0 \\ 0 & a^* - b \end{pmatrix}$$

Also, FIG. 2(*b*) shows a structural diagram of a Sagnac interferometer mode optical fiber type variable light-wave functional circuit [5] and [6]. Although operations of this structure of the optical fiber type variable lightwave functional circuit is slightly different from the operation of each of the above-described variable lightwave functional circuits, this variable lightwave functional circuit of FIG. 2(*b*) has such a merit that this entire functional circuit can be constituted by the optical fiber. In other words, this Sagnac interferometer mode optical fiber type variable lightwave functional circuit is provided with a 50%—fiber coupler 32 which is formed by using a PMF 31, and also an applying unit 35 of lateral pressure.

A Jones matrix "T" of the entire functional circuit shown in FIG. 2(*b*) may have such a polarization independent characteristic in the form of the following formula (7):

$$T = \frac{1}{\sqrt{2}} \times \frac{1}{\sqrt{2}} M_f + \frac{j}{\sqrt{2}} \times \frac{j}{\sqrt{2}} M_b = \frac{b - b^*}{2} \begin{pmatrix} 0 & 1 \\ 1 & 0 \end{pmatrix} \quad (7)$$

As previously explained, since the structure of the second embodiment mode is employed, it is possible to realize the polarization independent optical fiber type variable lightwave functional circuit.

C. Third Embodiment Mode

Figure 3:
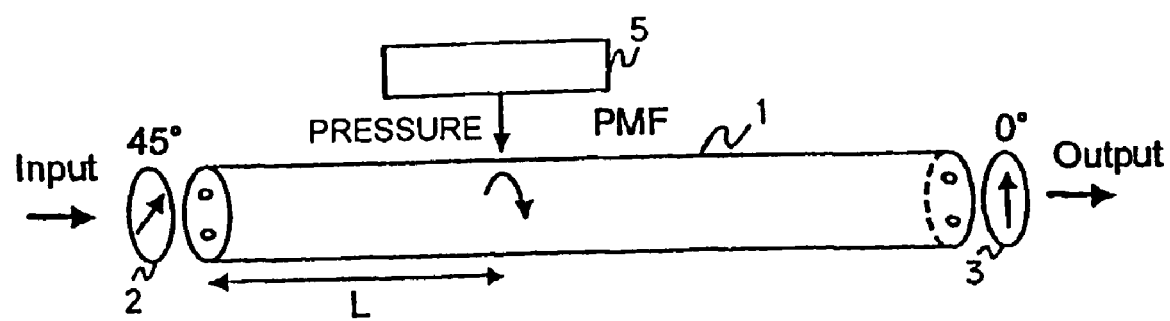
FIG. 3 is a structural diagram of a variable lightwave functional circuit of a third embodiment mode.

Next, FIG. 3 is a structural diagram for representing a variable lightwave functional circuit according to a third embodiment mode of the present invention. This third embodiment mode shows a periodic optical filter made by an optical fiber type variable lightwave functional circuit. In this embodiment mode, a periodic optical filter having the above-described function (1) is formed by employing the optical fiber type variable lightwave function of FIG. 1, so that a multi-wavelength light source whose wavelength interval is variable could be realized. At this time, as shown in this drawing, as to a position of lateral pressure applied by the applying unit 5, a single lateral-pressure applying point may be selected. Assuming now that the position of the lateral pressure applied by the applying unit 5 is selected to be such a position apart from the light entering port of the PMF 1 by a distance of "L", this transmission characteristic may become a sine waveform as expressed by the following formula (8), while the rotation angle is "θ":

$$|T|^2 = \frac{1}{2}(1 - \sin2\theta \cos\Delta\beta L), \quad (8)$$

$$\Delta\beta = \beta_x - \beta_y = \frac{B\omega}{c},$$

A wavelength interval "Δλ" obtained at this time is inversely proportional to the distance "L" as defined in the below-mentioned (9):

$$\Delta\lambda = \lambda^2/(BL) \quad (9)$$

Figure 4:
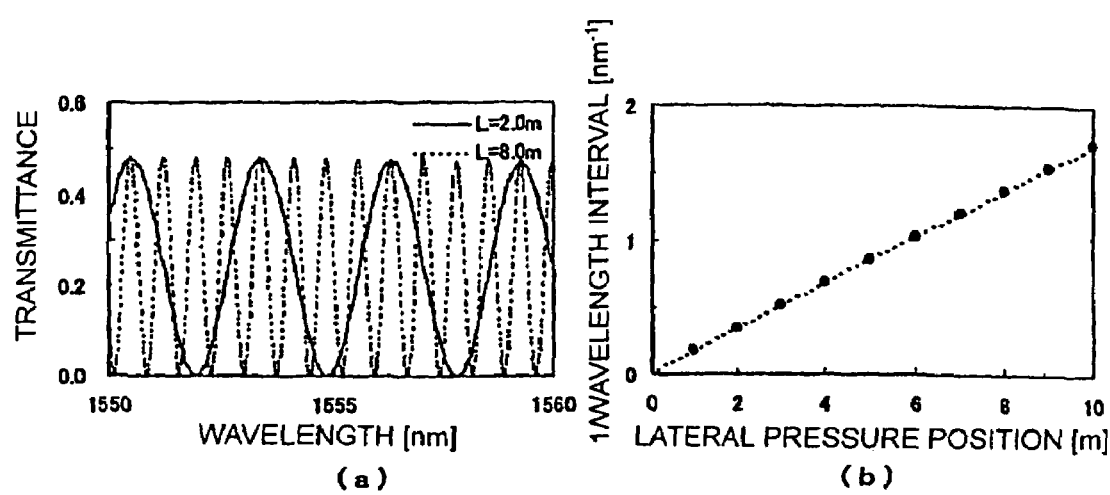
FIG. 4 shows a characteristic diagram of a periodic optical filter.

FIG. 4 represents a characteristic diagram of the periodic optical filter. FIG. 4(*a*) shows a periodic transmission characteristic diagram of a periodic optical filter which is actually manufactured. When the distance "L" is selected to be 2.0 m, the resulting periodic transmission characteristic diagram is indicated by a solid line. When the distance "L" is selected to be 8.0 m, the resulting periodic transmission characteristic diagram is indicated by a broken line. From this drawing, such a fact can be understood that the periodic transmission characteristic having the sine wave shape could be obtained by the variable lightwave functional circuit of the present invention. Also, FIG. 4(*b*) represents a lateral pressure/position dependent characteristic diagram of a wavelength interval. As shown in this drawing, such a fact may be understood that the wavelength interval "Δλ" is inversely proportional to the lateral pressure position "L". In this example, a relationship between the wavelength interval "Δλ" and the lateral pressure position "L" is given as the following formula (10) from FIG. 4(b):

$$\Delta\lambda = 5.81 \times 10^{-9} \times \frac{1}{L}. \tag{10}$$

D. Fourth Embodiment Mode

Figure 5:
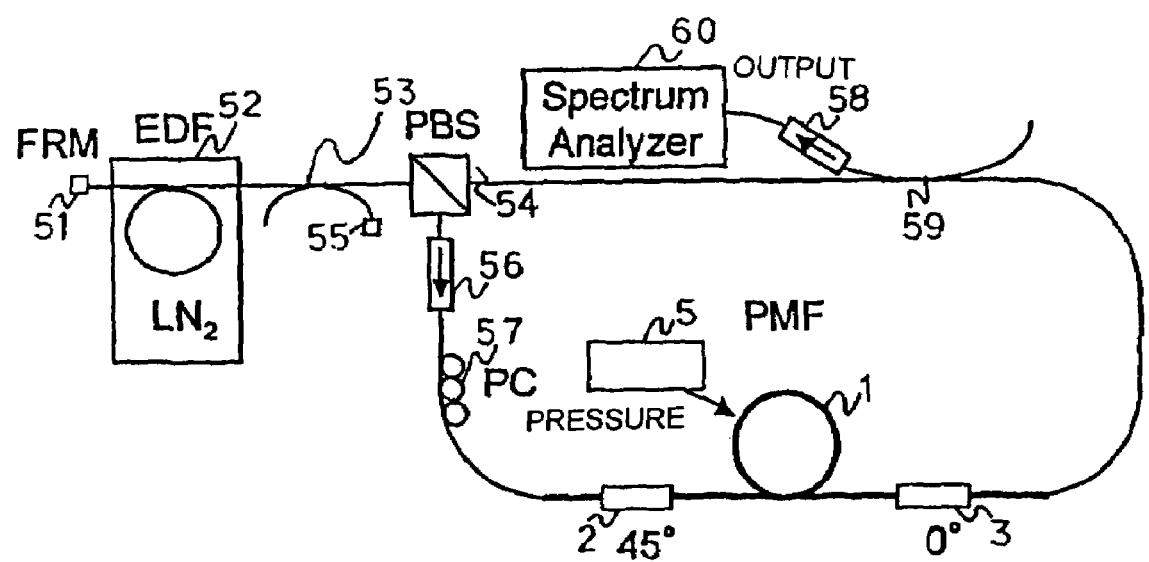
FIG. 5 is a structural diagram of a variable lightwave functional circuit of a fourth embodiment mode.

FIG. 5 shows a structural diagram of a variable lightwave functional circuit according to a fourth embodiment mode of the present invention. This fourth embodiment mode is a structural diagram of a wavelength-interval variable multi-wavelength optical fiber laser.

In this fourth embodiment mode, such a periodic optical filter as shown in the above-explained embodiment mode was inserted into an erbium doped optical fiber laser resonator shown in this drawing, and thus, such a multi-wavelength optical fiber laser could be realized, the wavelength interval of which could be varied by lateral pressure applied to a PMF. This corresponds to, as one example, an application example in which the structure of either FIG. 1 or FIG. 2 is employed as an optical fiber filter. In other words, in this embodiment mode, while this optical fiber filter is inserted into the resonator of the optical fiber laser, a multi-wavelength oscillation in a time period corresponding to the transmission characteristic may be realized.

In addition to the above-explained periodic optical filter, this optical fiber laser is equipped with a Faraday rotation mirror (FRM) 51, an erbium doped optical fiber (EDF) 52, a wavelength division multiplexing (WDM) coupler 53, a PBS 54, a pumping semiconductor laser 55, isolators 56/58, a polarization controller 57, a 10%-coupler 59, and a spectrum analyzer 60. While as the periodic optical fiber, a portion of a thick line, namely the PMF 1, the polarizers 2 and 3, and the applying unit 5 are equipped, since the applying unit 5 applies pressure to, as one example, one point within the PMF 1, such an optical fiber filter having a periodic transmission characteristic is realized.

The FRM 51 corresponds to a mirror capable of applying a polarization rotation due to the Faraday effect. The EDF 52 oscillates such a laser light having a wavelength of, for example, 1.55 μm. The pumping semiconductor laser 55 oscillates such a pumping light having a wavelength of, for example, 1.48 μm. The WDM coupler 53 corresponds to such an optical fiber coupler used to combine, for example, the pumping light having the wavelength of 1.48 μm oscillated from the pumping semiconductor laser 55 with the laser light having the wavelength of 1.55 μm oscillated by the EDF 52. It should be understood that a spectrum analyzer 60 corresponds to such a measuring device which monitors not a portion of the optical fiber laser according to this embodiment mode, but a spectrum of such a laser light which is outputted via both the coupler 59 and the isolator 58, and thus, confirms that the laser light is actually oscillated in the multi-wavelength mode.

Next, operations of such an optical fiber laser will now be explained. The erbium doped optical fiber laser (EDFA) is constituted by the FRM 51, the EDF 52, the WDM coupler 53, the pumping semiconductor laser 55, and the like. This EDFA is pumped by multiplexing the pumping semiconductor laser 55 having the wavelength of 1.48 μm by way of the WDM coupler 53 so as to oscillate laser. The output laser light of the EDFA is branched by the PBS 54. One branched light is entered via both the isolator 56 and the polarization controller 57 into the periodic optical filter equipped with the PMF 1 and the polarizers 2 and 3. Output light of this periodic optical filter is outputted via the 10%-coupler 59 as a laser output. It should be noted that in this case, this laser output is entered into the spectrum analyzer 60 so as to be measured. On the other hand, the output light is also inputted from the 10%-coupler 54 to the PBS 54. In this case, since the polarization axis is controlled by the PC 57, this controlled polarization axis is made coincident with the polarization axis passing through the PBS 54, and the entered light is propagated to the side of the EDFA so as to be resonated. It should also be noted that the propagation of the other branched light which is branched by the PBS 54 is blocked off by the isolator 56.

Figure 6:
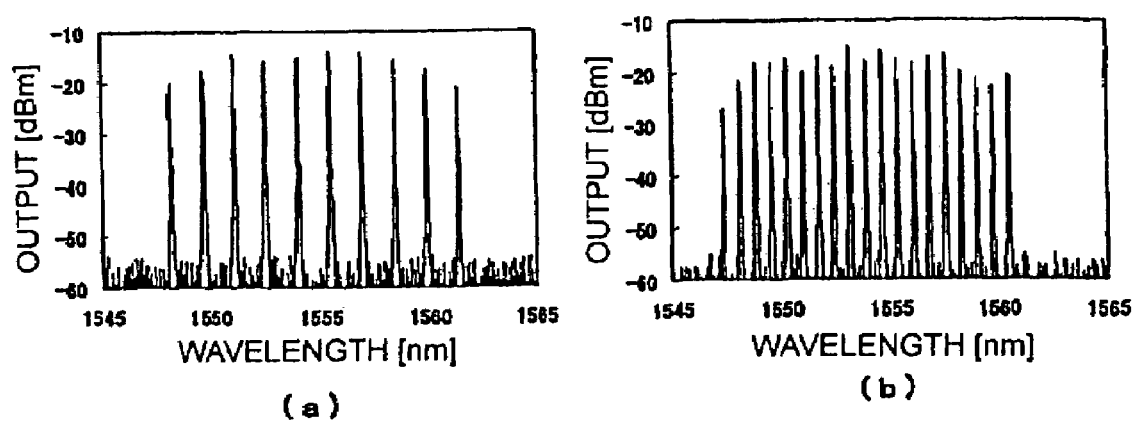
FIG. 6 is a diagram for showing a wavelength-interval variable multi-wavelength oscillation spectrum (1).

FIG. 6 shows a diagram of a wavelength-interval variable multi-wavelength oscillation spectrum (1). This is such a spectrum which is obtained when a multi-wavelength oscillation is realized, while the erbium doped optical fiber is cooled by using liquid nitrogen so as to be employed as a gain medium having in homogeneous broadening. FIG. 6(a) indicates a wavelength-interval variable multi-wavelength oscillation spectrum obtained in such a case that the length of the PMF 1 is selected to be 10 m, and the distance "L" over which the lateral pressure is applied is equal to 4 m. FIG. 6(b) indicates a wavelength-interval variable multi-wavelength oscillation spectrum obtained in such a case that the length of the PMF 1 is selected to be 10 m, and the distance "L" over which the lateral pressure is applied is equal to 8 m. As shown in this drawing, it may be understood that the laser light is oscillated in different wavelength intervals corresponding to the respective applied positions of the lateral pressure by the applying unit 5.

E. Fifth Embodiment Mode

Figure 7:
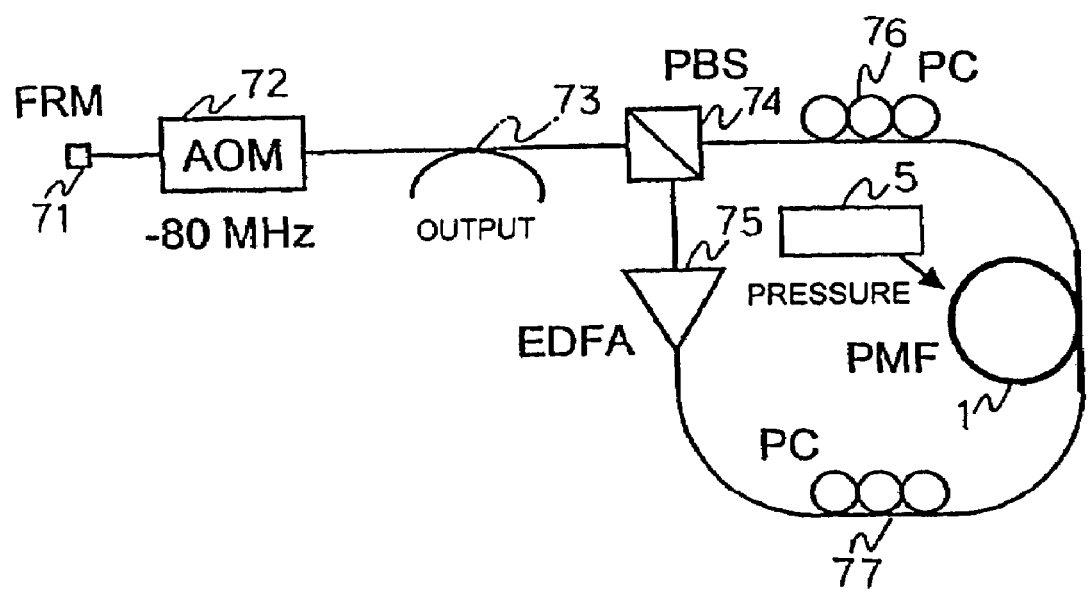
FIG. 7 is a structural diagram of a variable lightwave functional circuit of a fifth embodiment mode.

FIG. 7 shows a structural diagram of a variable lightwave functional circuit according to a fifth embodiment mode of the present invention. This fifth embodiment mode represents a wavelength-interval variable multi-wavelength optical fiber laser. In this fifth embodiment mode, since an acousto-optic modulator (AOM) is inserted into a resonator instead of the liquid nitrogen cooling, a multi-wavelength oscillation may be realized at a room temperature. This optical fiber laser is equipped with the above-explained periodic optical filter, an FRM 71, an AOM 72, a 10%-coupler 73, a PBS 74, an erbium doped optical fiber laser (EDFA) 75, and PCs 76 and 77. As previously explained, a portion of a thick line, namely both the PMF 1 and the applying unit 5 may realize such an optical fiber filter having a periodic transmission characteristic. Also, in this case, the optical fiber laser is oscillated in a proper wavelength interval in correspondence with a position of lateral pressure to the PMF 1 and/or the lateral pressure applied by the applying unit 5.

The AOM 72 may shift a frequency of light by such a frequency of an acoustic wave. Due to the characteristic aspect of the EDFA 75, this EDFA 75 does not oscillate in the multi-wavelength mode in the room temperature, but must be cooled up a temperature of −196° C. by using, for example, liquid nitrogen ($LN_2$). However, since the AOM 72 is inserted, an oscillation threshold value becomes infinite and thus the EDFA 75 is not oscillated as a matter of fact. As a result, the multi-wavelength laser output may be obtained even in the room temperature.

Figure 8:
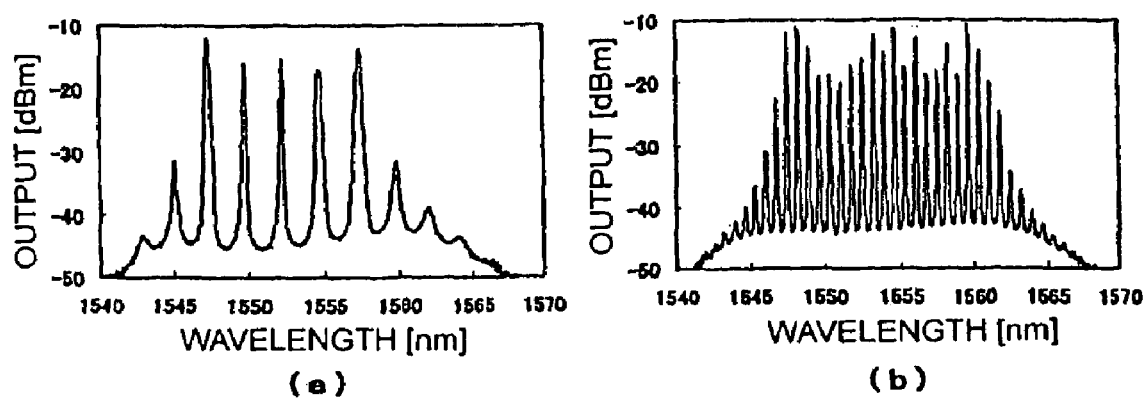
FIG. 8 is a diagram for showing a wavelength-interval variable multi-wavelength oscillation spectrum (2).
Figure 9:
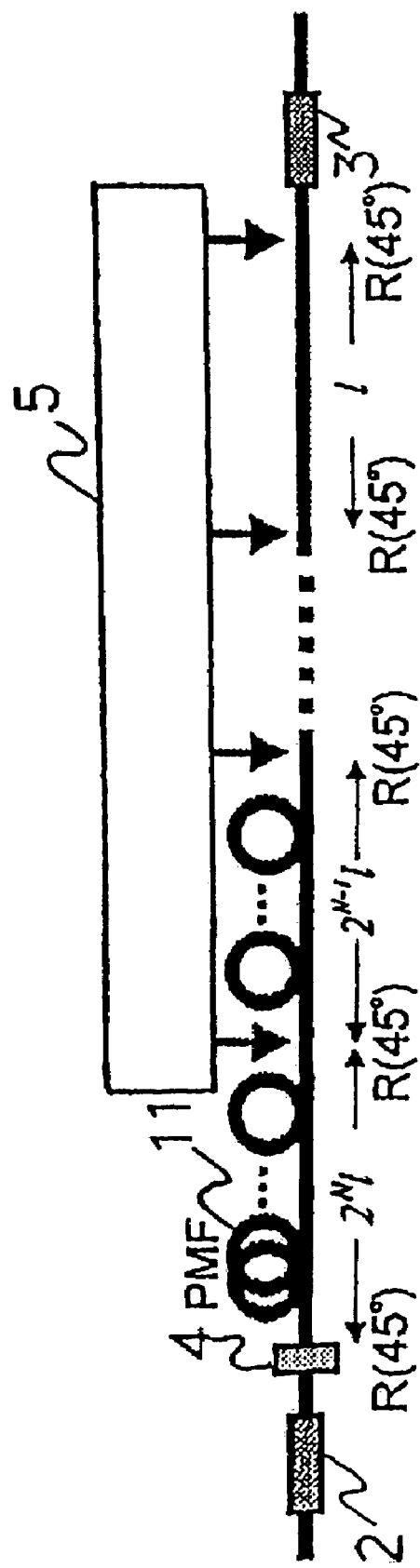
FIG. 9 is a structural diagram of a variable lightwave functional circuit of a sixth embodiment mode.

FIG. 8 shows a diagram of a wavelength-interval variable multi-wavelength oscillation spectrum (2). This is such a spectrum obtained when the multi-wavelength oscillation at the room temperature is realized by the AOM 72. In this example, FIG. 8(a) indicates a wavelength-interval variable multi-wavelength oscillation spectrum obtained in such a case that the length of the PMF 1 is selected to be 10 m, and the distance "L" over which the lateral pressure is applied is equal to 2.3 m. FIG. 8(*b*) indicates a wavelength-interval variable multi-wavelength oscillation spectrum obtained in such a case that the length of the PMF 1 is selected to be 10 m, and the distance "L" over which the lateral pressure is applied is equal to 8.25 m. As shown in this drawing, it may be understood that the laser light is oscillated in such wavelength intervals corresponding to the respective applied positions of the lateral pressure and the lateral pressure applied by the applying unit 5. ps F. Sixth Embodiment Mode FIG. 9 shows a structural diagram of a variable lightwave functional circuit according to a sixth embodiment mode of the present invention. This sixth embodiment mode represents a pulse multiplexing circuit. A pulse multiplexing circuit having the above-described function (4) is realized as shown in this drawing by way of this optical fiber type variable lightwave functional circuit. While as to the respective positions from a zero-th position to an N-th ("N" being an integer) position where lateral pressure is applied to a PMF 11, an interval from one end of the PMF 11 up to the zero-th position is defined as "$2^N L$" ("L" being a predetermined length); an interval from the zero-th position up to a first position is defined as "$2_{N-1}L$"; . . . ; an interval from a (k−1)-th position up to a k-th position is defined as $2^{N-k}L$; . . . ; and an interval from an (N−1)-th position up to an N-th position is defined as $2^0 L$, the applying unit 5 applies lateral pressure in such a way that equal rotations are applied to the respective positions. As a result, the pulse multiplexing circuit multiplexes a repetition frequency of a pulse stream of inputted light to output the multiplexed pulse stream. In this example, the polarization axis is rotated by an angle of 45 degrees at the respective positions by applying the lateral pressure by the applying unit 5. However, the present invention is not limited to this example, but a proper rotation may be applied. As described above, instead of the rotator 4, the polarization axis may be rotated by a predetermined angle by changing a method of applying lateral pressure, or a jointing method.

Figure 10:
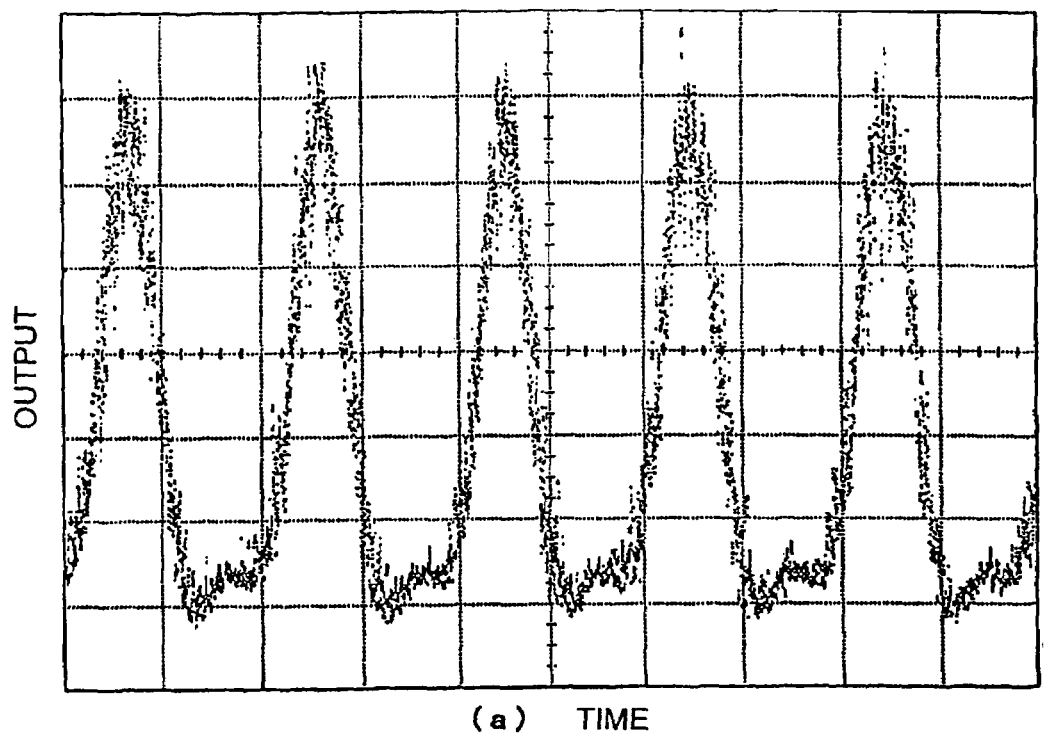
FIG. 10 is an explanatory diagram for explaining an optical pulse stream to be inputted and an optical pulse stream to be outputted.
Figure 10:
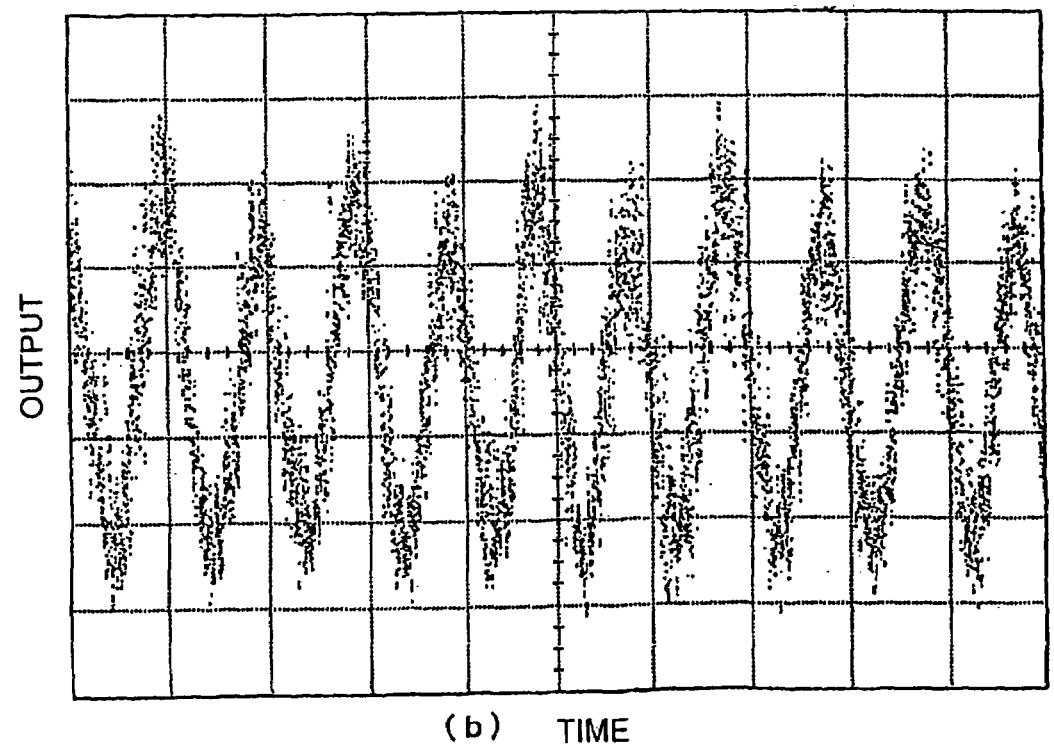

FIG. 10 shows an explanatory diagram for explaining an optical pulse stream to be inputted, and an optical pulse stream to be outputted.

Such an optical pulse stream as shown in FIG. 10(*a*) is inputted from a left side as viewed in this drawing. In the case of FIG. 10(*a*), as an example, a repetition frequency of the optical pulse is 10 GHz, and this optical pulse is employed in a communication of 10 Gbit/s. When this optical pulse is inputted to the variable lightwave functional circuit of the embodiment mode shown in FIG. 6, and proper pressure is applied at N places, the repetition frequency may become "$2^N$" due to a delay characteristic of xy polarization axes of the PMF 11, and thus, the optical pulse is multiplexed. As a consequence, this optical pulse may be employed in a communication at a higher speed than the input laser light. FIG. 10(*b*) shows an output optical pulse stream in the case of N=1, and represents that an optical pulse stream having a repetition frequency of 20 GHz. As a consequence, such an optical pulse stream may be maintained in which the optical pulse stream (FIG. 10(*a*)) having the repetition frequency of 10 GHz is multiplexed to obtain a repetition frequency of 20 GHz.

G. Others

It should be understood that as to the various sorts of setting conditions such as the branching/coupling ratios of the respective couplers, the wavelengths/power of the laser light, the lengths of the PMFs, the magnitudes/positions/temporal changes of the lateral pressure applied by the applying unit, the joint angles/joint means between either the polarizers or the rotators and the PMFs, one example is merely indicated in the above-explained respective embodiment modes, and thus, these setting conditions may be properly changed.

(Reference Publications)

[1] "OPTICAL TRANSMISSION CIRCUIT" written by T. OZEKI, The Institute of Electronics, Information, Communication Engineers, 2000.

INDUSTRIAL APPLICABILITY

As previously described, according to the present invention, both the optical fiber type variable lightwave functional circuit and the variable lightwave functional apparatus can be provided which are capable of properly accepting the structural changes in the WDM optical network, and furthermore, capable of having the flexibilities as to various functions. As a consequence, in accordance with the present invention, a large number of functions can be realized, and moreover, the present invention can be applied to optical communication apparatus such as WDM optical networks and optical transmitting/receiving devices. These various functions involve the optical filtering, the wavelength add/drop operation, the pulse multiplexing operation, the optical amplifier gain equalizing operation, the optical fiber wavelength dispersion compensating operation, and the like. Also, in accordance with the present invention, it is possible to realize both the variable light wave functional circuit and the variable lightwave functional apparatus, such as the optical transversal filter whose characteristic is variable and which owns the higher functions, while the lateral-pressure induced polarization mode coupling of the PMF is used instead of the PMF rotational connection, and thus, both the position and the magnitude of the lateral pressure are changed.

The invention claimed is:

1. A variable lightwave functional circuit comprising:
   an applying unit for applying lateral pressure;
   a polarization-maintaining optical fiber having a polarization axis, for inducing a polarization mode coupling by applying the lateral pressure to a predetermined position by said applying unit; and
   a branching/coupling device having a first port to a fourth port, for branching laser light inputted from the first port to both said second port and said third port, and also for projecting laser light inputted from said second port to the fourth port; wherein:
   one end of said polarization-maintaining optical fiber is connected to one of said second port and said third port in such a manner that the polarization axis is inclined at a predetermined angle to an axial direction parallel to a branching plane of said branching/coupling device;
   the other end of said polarization-maintaining optical fiber is connected to the other of said second port and said third port in such a manner that the polarization axis is made coincident with said axial direction parallel to said branching plane of said branching/coupling device;
   laser light is entered from the first port of said branching/coupling device via the third port to said polarization-maintaining optical fiber; said polarization-maintaining optical fiber changes a characteristic related to either a transmission wavelength or a repetition frequency of a pulse stream by the induced polarization mode coupling in response to either a single condition of a position, a quantity, and a magnitude of lateral pressure applied by said applying unit, or plural conditions thereof; and said polarization-maintaining optical fiber projects the laser light whose characteristic has been changed from said fourth port of said branching/coupling device.

2. A variable lightwave functional circuit as claimed in claim 1 wherein:
said branching/coupling device is a polarization beam splitter and
said variable lightwave functional circuit further comprising: a polarizer arranged between either said second port or said third port of said branching/coupling device and said polarization-maintaining optical fiber, the polarization axis of which is adjusted in such a manner that the laser light whose characteristic has been changed passes through said branching/coupling device.

3. A variable lightwave functional circuit as claimed in any one of claims 1 or 2, further comprising:
a rotator for inclining a polarization axis of entered laser light at a predetermined angle with respect to the polarization axis of said polarization-maintaining optical fiber.

4. A variable lightwave functional circuit as claimed in any one of claims 1 or 2, wherein:
said applying unit applies the lateral pressure to said polarization-maintaining optical fiber at either one point or plural points in equal intervals.

5. A variable lightwave functional circuit as claimed in any one of claims 1 or 2, wherein:
said applying unit applies the lateral pressure to said polarization-maintaining optical fiber at positions defined from a zero-th position to an N-th (symbol "N" being integer) position, where an interval from one end of said polarization-maintaining optical fiber up to the zero-th position is defined as $2^N L$ (symbol "L" being predetermined length), an interval between the zero-th position and a first position is defined as $2^{N-1}L$, - - -, an interval between a(k–1)-th position and a k-th position is defined as $2^{N-k}L$, - - -, and an interval between an (N–1)-th position and the N-th position is defined as $2^0 L$; and said applying unit applies the lateral pressure in such a manner that equal rotations are applied at the respective positions, so that a repetition frequency of a pulse stream of entered laser light is multiplexed.

6. A variable lightwave functional circuit as claimed in any one of claims 1 or 2, wherein:
either the characteristic to be changed or a function to be changed includes one of a time period, a center wavelength, a bandwidth, a wavelength to be derived, a repetition frequency, a gain, a group velocity, and a dispersion.

7. A variable lightwave functional circuit as claimed in any one of claims 1 or 2, wherein:
the entered laser light corresponds to wavelength division multiplexed laser light.

8. A variable lightwave functional circuit as claimed in any one of claims 1 or 2, wherein:
a predetermined angle of mutual polarization axes defined between said polarization-maintaining optical fiber and said first polarizer, said second polarizer, or said branching/coupling device is either 45 degrees or approximately 45 degrees.

9. A method for making a variable lightwave functional circuit, said method comprising:
providing an applying unit for applying lateral pressure;
providing a polarization-maintaining optical fiber having a polarization axis, for inducing a polarization mode coupling by applying the lateral pressure to a predetennined position by said applying unit;
providing a branching/coupling device having a first port to a fourth port, for branching laser light inputted from the first port to both said second port and said third port, and also for projecting laser light inputted from said second port to the fourth port; wherein
one end of said polarization-maintaining optical fiber is connected to one of said second port and said third port in such a manner that the polarization axis is inclined at a predetermined angle to an axial direction parallel to a branching plane of said branching/coupling device;
the other end of said polarization-maintaining optical fiber is connected to the other of said second port and said third port in such a manner that the polarization axis is made coincident with said axial direction parallel to said branching plane of said branching/coupling device; and
laser light is entered from the first port of said branching/coupling device via the third port to said polarization-maintaining optical fiber; said polarization-maintaining optical fiber changes a characteristic related to either a transmission wavelength or a repetition frequency of a pulse stream by the induced polarization mode coupling in response to either a single condition of a position, a quantity, and a magnitude of lateral pressure applied by said applying unit, or plural conditions thereof; and said polarization-maintaining optical fiber projects the laser light whose characteristic has been changed from said fourth port of said branching/coupling device.

10. A method of using a variable lightwave functional circuit, said variable lightwave functional circuit comprising:
an applying unit for applying lateral pressure;
a polarization-maintaining optical fiber having a polarization axis, for inducing a polarization mode coupling by applying the lateral pressure to a predetermined position by said applying unit;
a branching/coupling device having a first port to a fourth port, for branching laser light inputted from the first port to both said second port and said third port, and also for projecting laser light inputted from said second port to the fourth port; wherein
one end of said polarization-maintaining optical fiber is connected to one of said second port and said third port in such a manner that the polarization axis is inclined at a predetermined angle to an axial direction parallel to a branching plane of said branching/coupling device;
the other end of said polarization-maintaining optical fiber is connected to the other of said second port and said third port in such a manner that the polarization axis is made coincident with said axial direction parallel to said branching plane of said branching/coupling device;

laser light is entered from the first port of said branching/ coupling device via the third port to said polarization-maintaining optical fiber; said polarization-maintaining optical fiber changes a characteristic related to either a transmission wavelength or a repetition frequency of a pulse stream by the induced polarization mode coupling in response to either a single condition of a position, a quantity, and a magnitude of lateral pressure applied by said applying unit, or plural conditions thereof; and said polarization-maintaining optical fiber projects the laser light whose characteristic has been changed from said fourth port of said branching/coupling device;

said method comprising transmitting laser light into said polarization-matching optical fiber; and applying lateral pressure to said polarization-matching optical fiber.

* * * * *

UNITED STATES PATENT AND TRADEMARK OFFICE
CERTIFICATE OF CORRECTION

| | | |
|---|---|---|
| PATENT NO. | : 7,200,291 B2 | Page 1 of 1 |
| APPLICATION NO. | : 11/439148 | |
| DATED | : April 3, 2007 | |
| INVENTOR(S) | : Shinji Yamashita | |

It is certified that error appears in the above-identified patent and that said Letters Patent is hereby corrected as shown below:

Column 14,
please replace lines 12-14 now reading:

"a polarization axis, for inducing a polarization mode coupling by applying the lateral pressure to a predetennined position by said applying unit;"

with the following:

--a polarization axis, for inducing a polarization mode coupling by applying the lateral pressure to a predetermined position by said applying unit;--

Signed and Sealed this

Twelfth Day of June, 2007

JON W. DUDAS
*Director of the United States Patent and Trademark Office*